(12) United States Patent
Anderson et al.

(10) Patent No.: US 7,720,242 B2
(45) Date of Patent: May 18, 2010

(54) FLEXIBLE JOINT FOR EXTENDED WEAR HEARING DEVICE

(75) Inventors: Greg Anderson, Fremont, CA (US); Adnan Shennib, Dublin, CA (US); Robert Schindler, San Francisco, CA (US); Alex Tilson, Burlingame, CA (US); Steve Blumenkranz, Redwood City, CA (US); Ian Day, Fremont, CA (US)

(73) Assignee: InSound Medical, Inc., Newark, CA (US)

( * ) Notice: Subject to any disclaimer, the term of this patent is extended or adjusted under 35 U.S.C. 154(b) by 1085 days.

(21) Appl. No.: 11/202,643

(22) Filed: Aug. 12, 2005

(65) Prior Publication Data

US 2007/0036379 A1 Feb. 15, 2007

(51) Int. Cl.
*H04R 25/00* (2006.01)
(52) U.S. Cl. .................... 381/328; 381/322; 381/324
(58) Field of Classification Search ................ 381/309, 381/322, 324, 325, 326, 328, 380, 382; 181/129, 181/130, 135
See application file for complete search history.

(56) References Cited

U.S. PATENT DOCUMENTS

| | | | | |
|---|---|---|---|---|
| 3,527,901 A | * | 9/1970 | Geib | ........................... 381/328 |
| 5,701,348 A | * | 12/1997 | Shennib et al. | ............. 381/328 |
| 5,742,692 A | | 4/1998 | Garcia et al. | |
| 5,825,896 A | * | 10/1998 | Leedom | ....................... 381/322 |
| 6,367,578 B1 | | 4/2002 | Shoemaker | |
| 6,473,513 B1 | | 10/2002 | Shennib et al. | |
| 6,940,988 B1 | | 9/2005 | Shennib et al. | |
| 2001/0008560 A1 | | 7/2001 | Stonikas et al. | |

\* cited by examiner

*Primary Examiner*—Huyen D Le
(74) *Attorney, Agent, or Firm*—Townsend and Townsend and Crew LLP

(57) ABSTRACT

Various embodiments provide a flexible joint for extended wear hearing devices. One embodiment provides a flexible joint for a hearing device comprising a compliant tube having a lateral and a medial end, a pivotal portion and a lumen. The hearing device can include a CIC hearing aid positioned in the bony portion of the ear canal. The tube ends are configured to be coupled to lateral and medial device assemblies. The tube allows the lateral assembly to advance the medial assembly into the bony portion of the ear canal and have the lateral and medial assemblies conform to the shape of the ear canal via pivotal movement. The tube also acoustically decouples the two assemblies. The pivotal portion can comprise a necked portion or otherwise have decreased stiffness relative to other tube portions. The tube can be shaped to fit over and retain one or both assemblies.

24 Claims, 10 Drawing Sheets

Lateral ← → Medial

FLEXIBLE JOINT FOR EXTENDED WEAR HEARING DEVICE

BACKGROUND OF THE INVENTION

Field of the Invention

Embodiments of invention relate to hearing devices. More specifically embodiments of the invention relate to flexible joints for improving the comfort and fit of continuous or extended wear hearing aids.

Since many hearing aid devices are adapted to be fit into the ear canal, a brief description of the anatomy of the ear canal will now be presented for purposes of illustration. While, the shape and structure, or morphology, of the ear canal can vary from person to person, certain characteristics are common to all individuals. Referring now to FIGS. 1-2, the external acoustic meatus (ear canal) is generally narrow and contoured as shown in the coronal view in FIG. 1. The ear canal 10 is approximately 25 mm in length from the canal aperture 17 to the center of the tympanic membrane 18 (eardrum). The lateral part (away from the tympanic membrane) of the ear canal, a cartilaginous region 11, is relatively soft due to the underlying cartilaginous tissue. The cartilaginous region 11 of the ear canal 10 deforms and moves in response to the mandibular (jaw) motions, which occur during talking, yawning, eating, etc. The medial (towards the tympanic membrane) part, a bony region 13 proximal to the tympanic membrane, is rigid due to the underlying bony tissue. The skin 14 in the bony region 13 is thin (relative to the skin 16 in the cartilaginous region) and is more sensitive to touch or pressure. There is a characteristic bend 15 that roughly occurs at the bony-cartilaginous junction 19 (referred to herein as the bony junction), which separates the cartilaginous 11 and the bony 13 regions. The magnitude of this bend varies among individuals.

A cross-sectional view of the typical ear canal 10 (FIG. 2) reveals generally an oval shape and pointed inferiorly (lower side). The long diameter ($D_L$) is along the vertical axis and the short diameter ($D_S$) is along the horizontal axis. These dimensions vary among individuals.

Hair 5 and debris 4 in the ear canal are primarily present in the cartilaginous region 11. Physiologic debris includes cerumen (earwax), sweat, decayed hair, and oils produced by the various glands underneath the skin in the cartilaginous region. Non-physiologic debris consists primarily of environmental particles that enter the ear canal. Canal debris is naturally extruded to the outside of the ear by the process of lateral epithelial cell migration (see e.g., Ballachanda, The Human ear Canal, Singular Publishing, 1995, pp. 195). There is no cerumen production or hair in the bony part of the ear canal.

The ear canal 10 terminates medially with the tympanic membrane 18. Laterally and external to the ear canal is the concha cavity 2 and the auricle 3, both also cartilaginous. The junction between the concha cavity 2 and the cartilaginous part 11 of the ear canal at the aperture 17 is also defined by a characteristic bend 12 known as the first bend of the ear canal.

First generation hearing devices were primarily of the Behind-The-Ear (BTE) type. However, they have been largely replaced by In-The-Canal (ITC) hearing devices are of which there are three types. In-The-Ear (ITE) devices rest primarily in the concha of the ear and have the disadvantages of being fairly conspicuous to a bystander and relatively bulky to wear. Smaller In-The-Canal (ITC) devices fit partially in the concha and partially in the ear canal and are less visible but still leave a substantial portion of the hearing device exposed. Recently, Completely-In-The-Canal (CIC) hearing devices have come into greater use. These devices fit deep within the ear canal and can be essentially hidden from view from the outside.

In addition to the obvious cosmetic advantages, CIC hearing devices provide, they also have several performance advantages that larger, externally mounted devices do not offer. Placing the hearing device deep within the ear canal and proximate to the tympanic membrane (ear drum) improves the frequency response of the device, reduces distortion due to jaw extrusion, reduces the occurrence of the occlusion effect and improves overall sound fidelity.

However, despite their advantages, many CIC hearing devices continue to have performance issues including issues relating to fit of the device in the ear canal, acoustic feedback and retention of the seal which are used to hold the device in place in the ear canal and/or also to prevent acoustic feedback. As described below the ear canal can vary in size and shape and therefore many CIC hearing devices (e.g. those including rigid structures) can require custom fitting (e.g. making of a mold or taking of measurement) to insure that the device can be inserted and comfortably fit into the canal. Also even if fit properly the device may become uncomfortable if it has a rigid or otherwise inflexible structure which does not accommodate deformation of the canal e.g. such as that caused by jaw and/or head movement. Additionally on a long term basis such deformation can lead to irritation and ulceration of the canal due to force exerted on the canal by the hearing device in response to the deformation. Therefore, there is a need for a hearing device having mechanical properties to accommodate for the variability in the shape of the ear canal as well as for deformations in the canal.

Acoustical feedback is another issue with many hearing devices. One form of acoustic feedback is oscillatory feedback which occurs when there is acoustic leakage from the output of the hearing aid receiver through a leakage path which reaches the hearing aid microphone causing sustained oscillation. This oscillatory feedback is manifested by "whistling" or "squealing" which is both bothersome and interferes with communication. Oscillatory feedback is typically alleviated by tightly occluding (sealing) the ear canal between the microphone and the receiver. However complete sealing can prove difficult, for example, jaw motion of the user may cause deformation and thus leakage of the seal. During jaw movement the fleshy part moves relative to the bony part so that the hearing aid and/or seal are pressed to one side of the ear canal and a gap may be formed at the other side giving rise to an acoustical leakage path causing feedback. The seal can buckle due to non uniform distribution of forces on the seal and/or when the ear canal deforms resulting in an acoustical leak. The seal can also buckle or become unseated in the canal due to exertion of forces by the canal on the body of rigid structure or otherwise inflexible hearing device which are transferred to the seal. Accordingly, there is a need for hearing devices with improved flexibility to maintain proper positioning of the seal and the device in the ear canal.

BRIEF SUMMARY OF THE INVENTION

Various embodiments of the invention provide systems and assemblies for improving the fit and wearability of extended wear hearing aids including completely in the canal (CIC) hearing aids. Many embodiments provide a flexible joint for improving one or more of the comfort, fit, and performance of CIC hearing aids worn for extended periods including three to six months or longer. Specific embodiments provide a flexible joint that allows the hearing aid to conform to the shape of the ear canal allowing a hearing device to be inserted and worn by a user without the need for custom fitting or measurements.

One embodiment provides a flexible joint for a hearing device comprising a compliant tube or member having a lateral and a medial end, a pivotal portion and a lumen. The hearing device can include a CIC hearing aid configured to be positioned in the bony portion of the ear canal. The ends of the tube are configured to be coupled to lateral and second medial device assemblies, for example microphone and receiver assemblies. The tube is configured to allow the lateral assembly to advance the medial assembly into the bony portion of the ear canal and have the lateral and medial assemblies conform to the shape of the ear canal via pivotal movement of the lateral and medial assemblies. The tube also acoustically decouples the two assemblies. The pivotal portion can comprise a necked portion or otherwise have decreased stiffness relative to the other portions of the tube. The tube can be shaped to fit over and retain one or both of the assemblies. Also, the joint can be molded and can comprise a single integral structure or multiple structures which are joined together. At least a portion of the tube can comprises an elastomeric material such as a silastic.

In various embodiments, the joint can have material and/or mechanical properties and features to facilitate positioning and long term wear of a hearing device in the ear canal. Particular embodiments provide mechanical features such that a hearing device having such a flexible joint can comfortably by inserted and fit in virtually any patient's ear canal without the need for custom fitting, sizing or the taking of measurements. That is, the joint can be configured provide a hearing device with an off-the-shelf fit capability. This can achieved by configuring the pivotal portion of the joint to define a cone of pivotal movement of the medial assembly or lateral assembly so as to allow the device to have a range of motion to readily adapt to the shape of the ear canal during insertion and/or during jaw movement. Also, the joint can be configured to require minimal bending force for the joint to pivot as well as exerting minimal force on the ear canal in the process of pivoting such that user experiences or minimal or no pain from pivoting of the joint. In one embodiment, the bending force is less than about 2.3 grams of force.

The pivotal portion can also have sufficient torsional strength to allow rotation of the medial assembly in response to rotation of the lateral assembly when the device is positioned in the ear canal, e.g. the bony portion. Further, the tube is desirably configured to minimize the application of force to wiring or other components coupling the medial and lateral assemblies when the tube is put in tension, for example when the hearing device is removed from the ear canal.

Another embodiment provides an extended wear hearing device for operation in a bony portion of the ear canal comprising a microphone assembly and a receiver assembly. The hearing device can include a CIC hearing aid configured to be positioned deeply in the ear canal. The receiver assembly is configured to supply acoustic signals received from the microphone assembly to a tympanic membrane of the user. The microphone and/or the receiver assembly is configured to be electronically coupled to a battery assembly for powering the hearing device. The receiver assembly and the microphones assembly are coupled by a flexible joint configured to allow the microphone assembly to advance the receiver assembly into the ear canal with sufficient pivotal movement of the two assemblies for the device to conform to the shape of the ear. The joint also serves to acoustically decouple the assemblies (i.e. it prevents or minimizes direct acoustical transmission between the assemblies) by separating the ends of the assemblies and dampening sound propagated by either assembly through the joint. Similarly, by overlying portions of the assemblies it can serve to dampen any acoustical vibrations from incidental contact with the other assembly or contact with ear canal. The joint is desirably configured to mechanically isolate the two assemblies such that a sealing retainer coupled to one assembly and seated in the ear canal, is not unseated or otherwise deformed in response to a force exerted by the other assembly such as might occur from jaw or head movement. By maintaining proper seating, the function of the seals in preventing acoustical feedback from the receiver to the microphone as well as retaining the device in the ear canal is preserved. In this way, the joint serves to improve the fit and performance of a hearing device for periods of extended wear, for example, six months or longer.

In an exemplary embodiment of a method for using a hearing device having a flexible joint, the hearing device is inserted into the bony portion of the canal of the user and then worn in the ear canal with minimal pain from bending of the joint in the canal due to canal deformation from head or neck motion, chewing, yawning, etc.

These and other features and embodiments are described in detail in the body of specification. It should be appreciated that each of the features presented can be an independent embodiment or combined with one or more features to produce multiple embodiments within the scope of the invention.

DETAILED DESCRIPTION OF THE INVENTION

Various embodiments of the invention provide systems, devices and assemblies for improving the, comfort and fit of CIC and other hearing devices worn in the ear canal of a user on a long term basis. Specific embodiments provide a flexible joint for a CIC hearing aid worn in the bony portion of ear canal and methods of using the joint for positioning the device in the canal and maintaining a proper fit therein.

Figure 1:
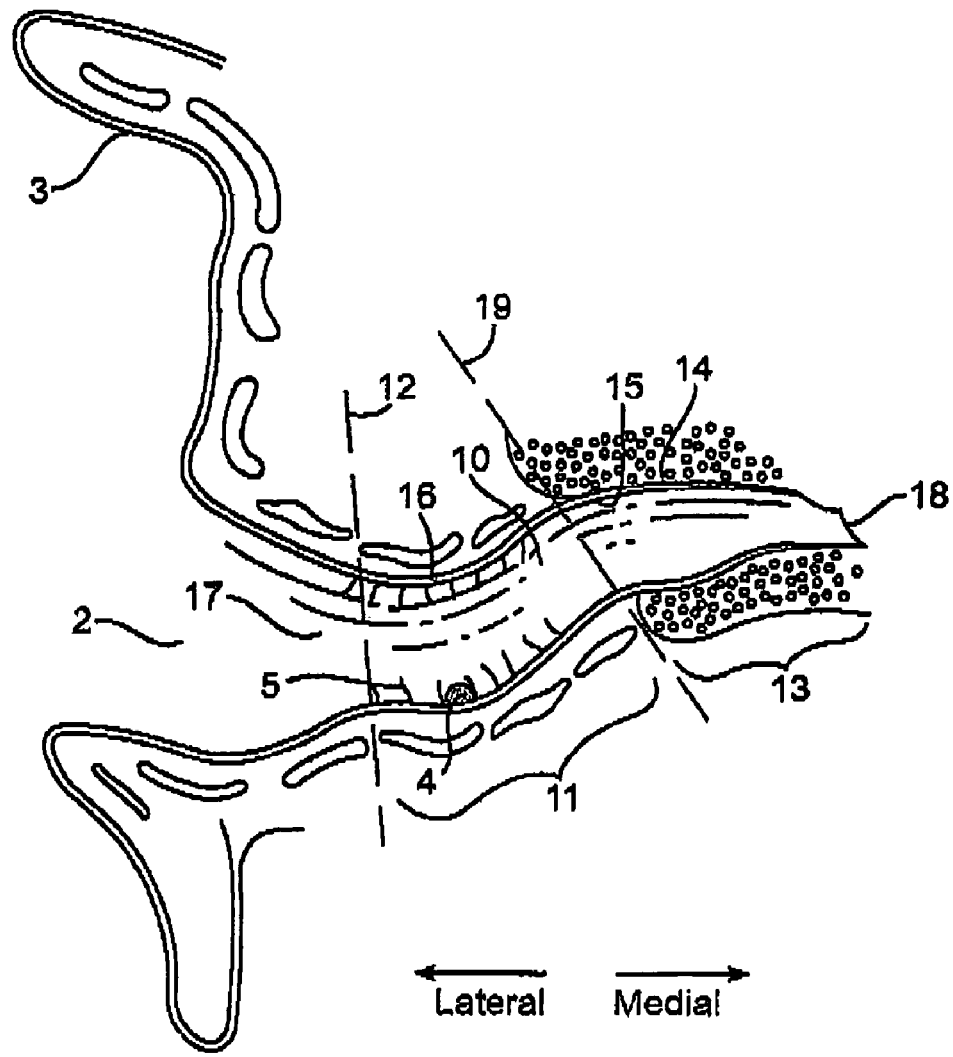
FIG. 1 is a side coronal view of the external ear canal.
Figure 2:
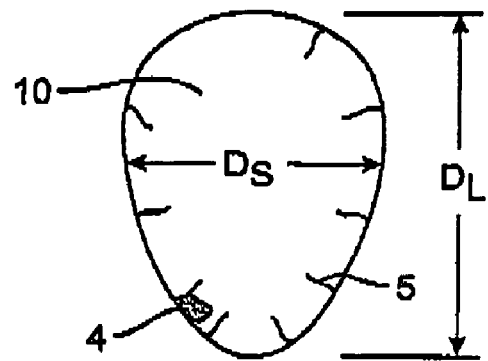
FIG. 2 is a cross-sectional view of the ear canal in the cartilaginous region.
Figure 3:
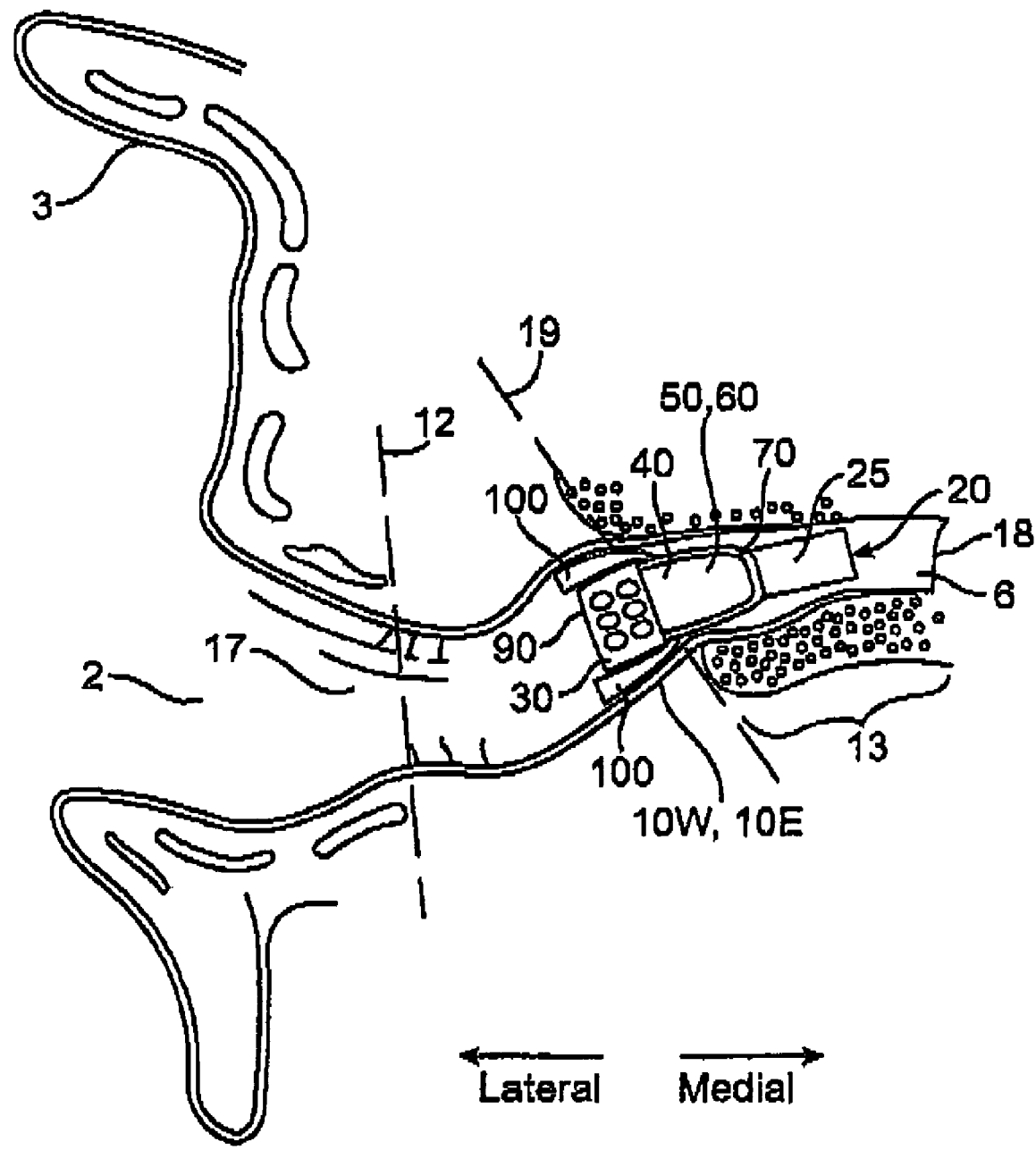
FIG. 3 is a lateral view illustrating an embodiment of a hearing aid device positioned in the bony portion of the ear canal.
Figure 4A:
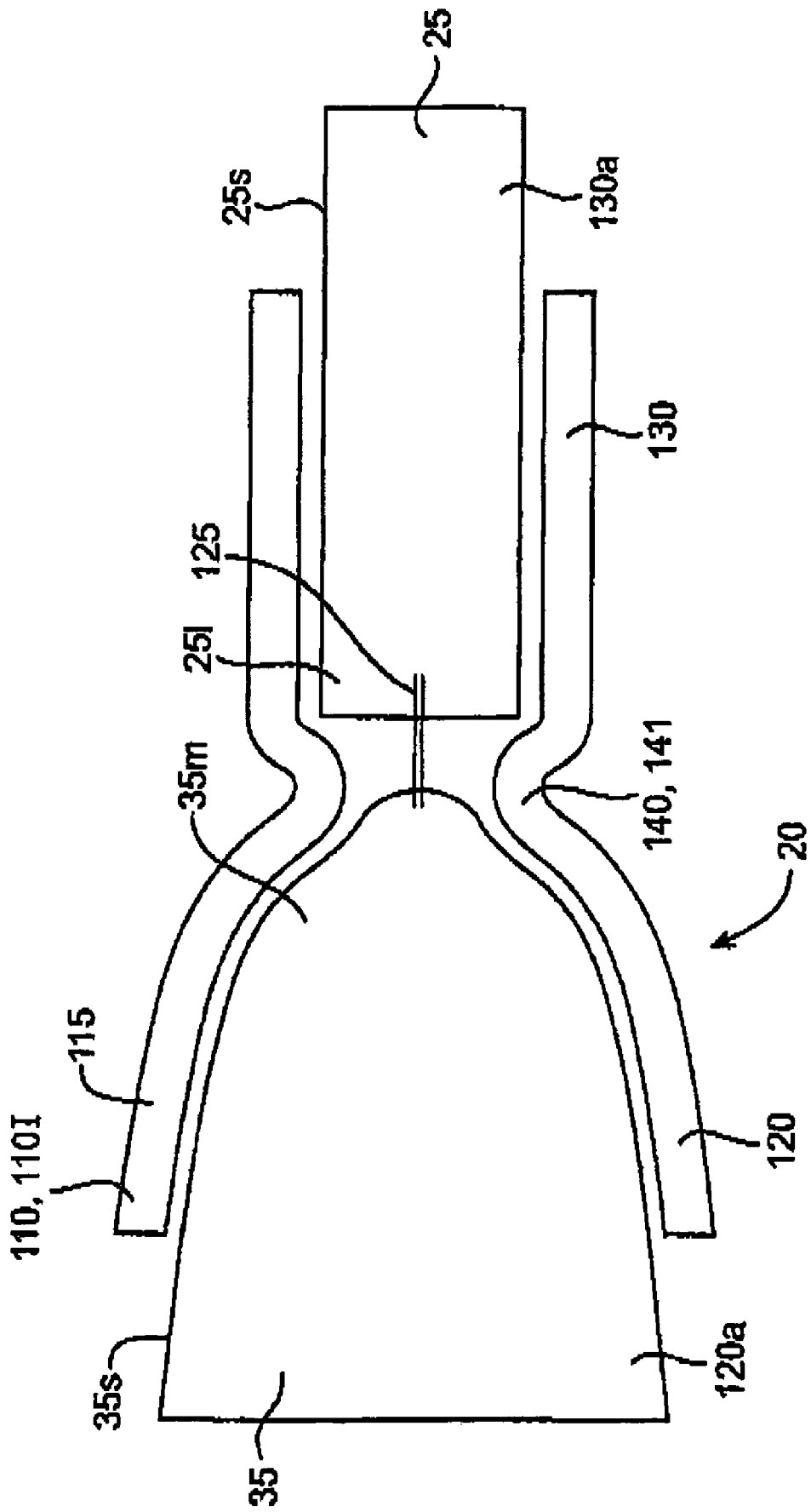
FIG. 4A is a lateral view illustrating an embodiment of a hearing device having a flexible joint.
Figure 4B:
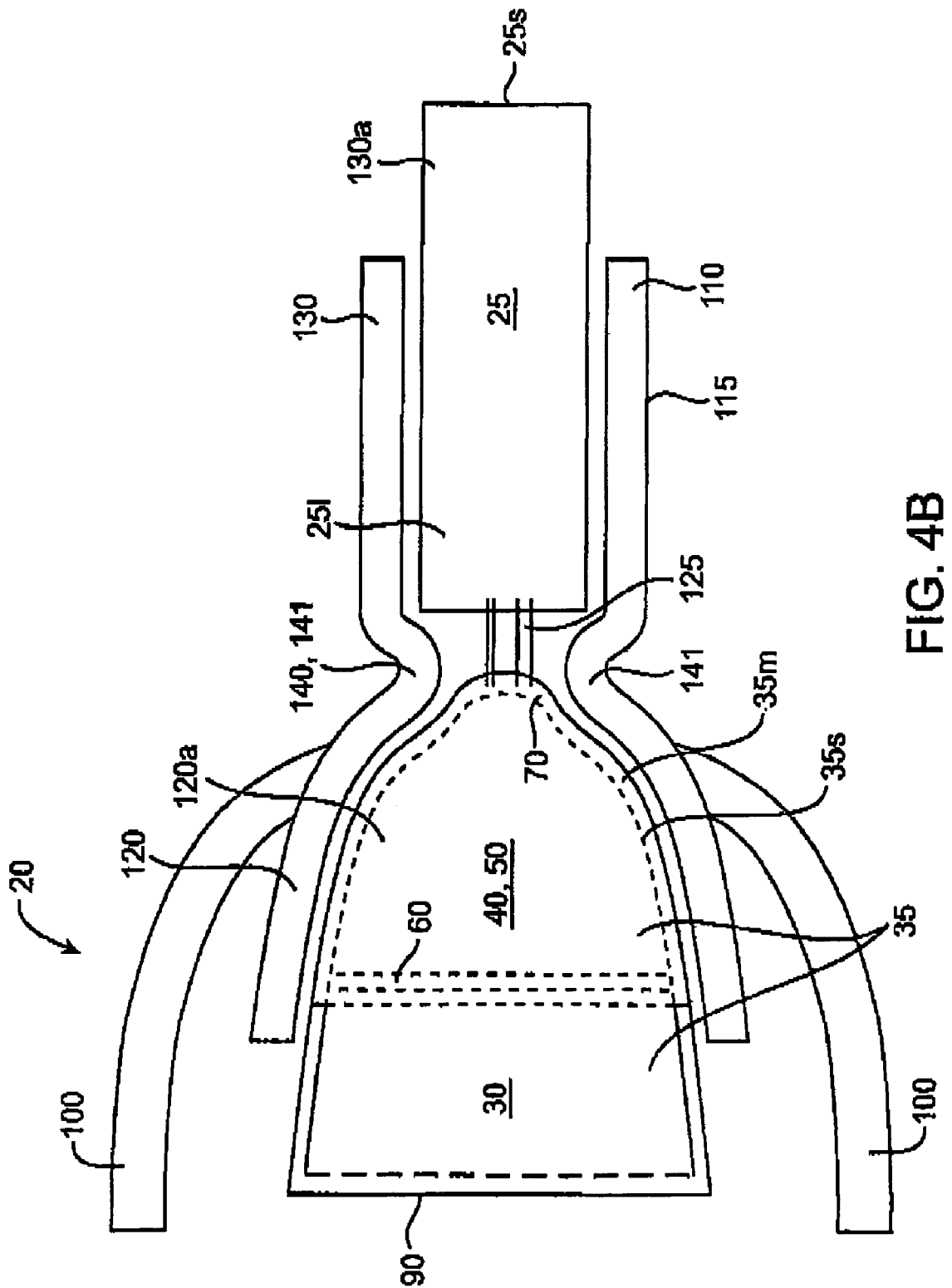
FIG. 4B is a lateral view illustrating another embodiment of a hearing device having a flexible joint and a seal coupled to the joint.
Figure 5A:
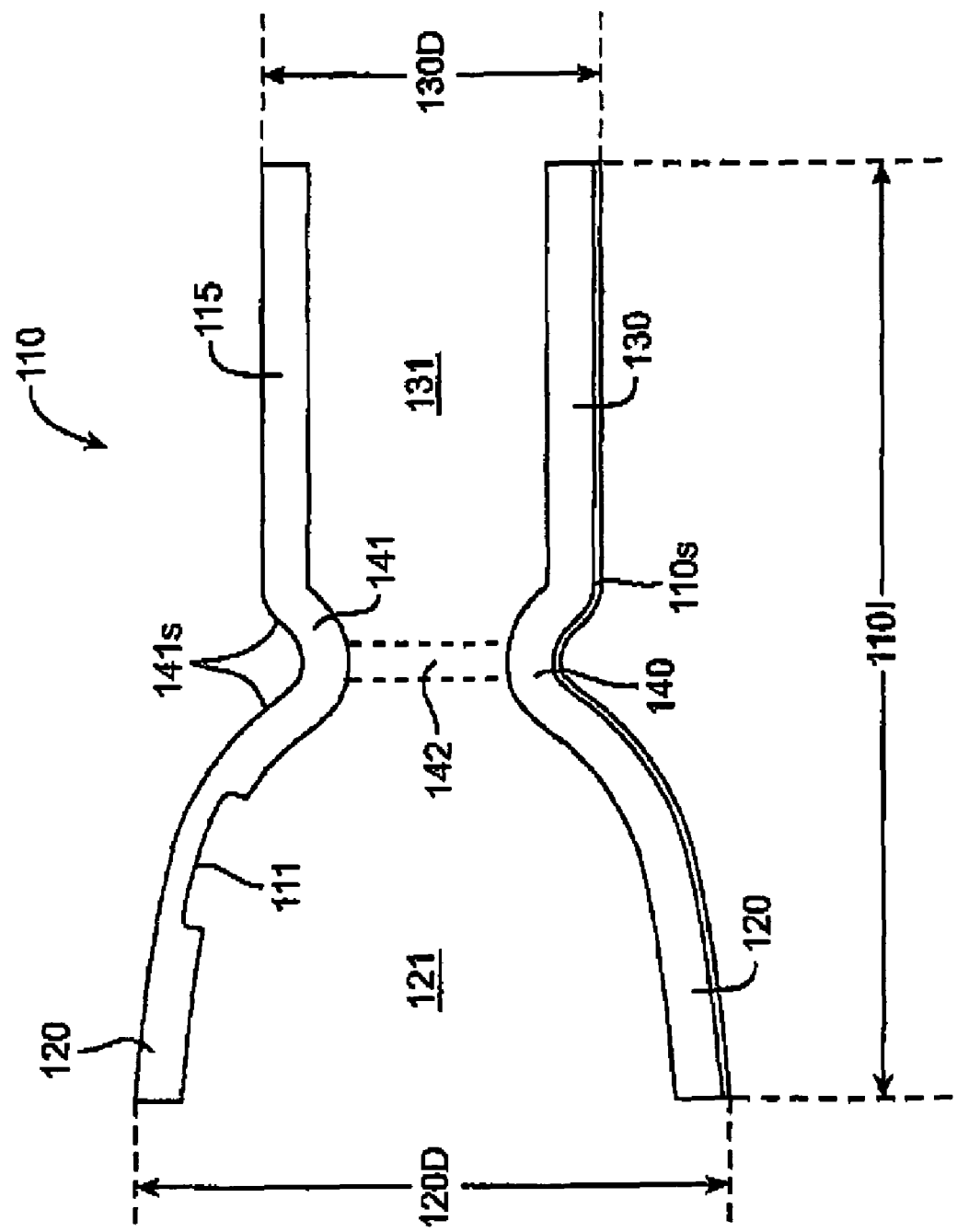
FIG. 5A is a side view illustrating an embodiment of the flexible joint.
Figure 5B:
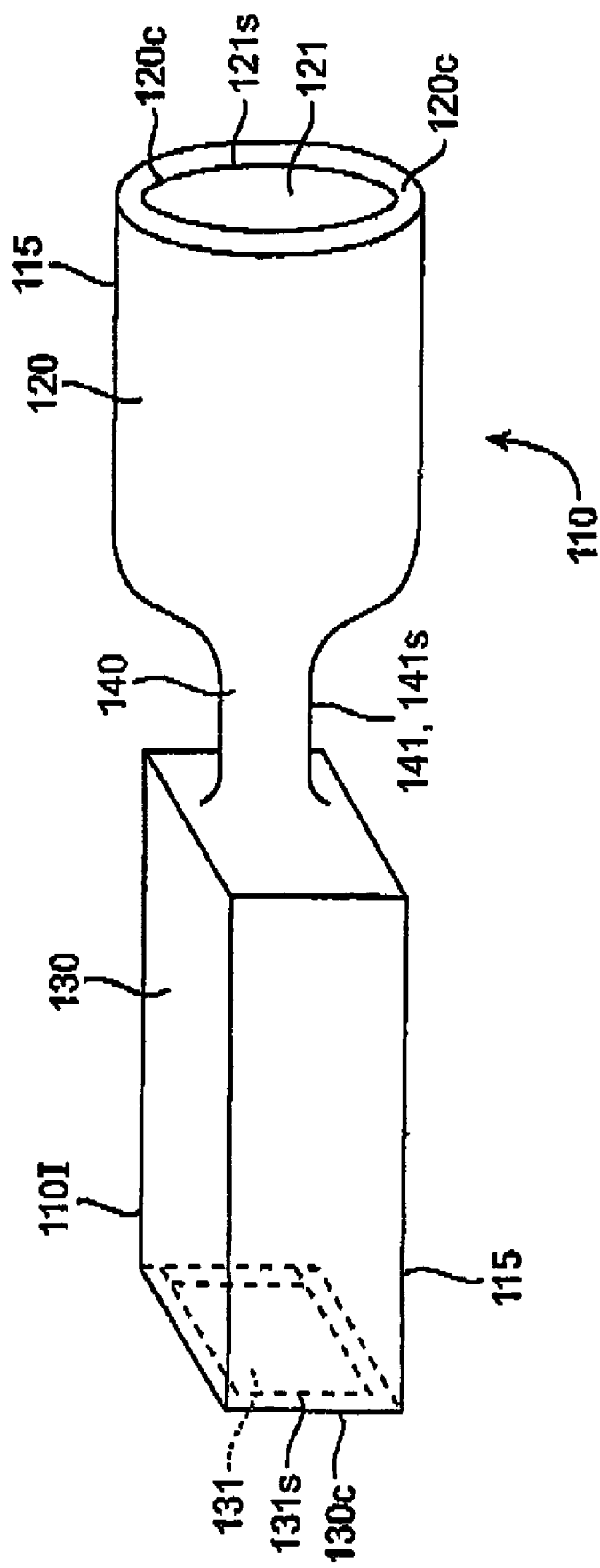
FIG. 5B is a perspective view illustrating an embodiment of the flexible joint.

Referring now to FIGS. 3-4, an embodiment of a hearing device 20 configured for placement and use in ear canal 10 can include a receiver (speaker) assembly 25, a microphone assembly 30, a battery assembly 40, a cap assembly 90 and one or more sealing retainers 100 (also called seal 100) that can be coaxially positioned over receiver assembly 25 and/or microphone assembly 30. Seal 100 is configured to provide the primary support for the device 20 within the ear canal 10 and protect it from contact with the walls 10W of the ear canal.

Receiver assembly 25 is configured to supply acoustical signals received from the microphone assembly to a tympanic membrane of the wearer of the device. Battery assembly 40 includes a battery 50, and can also include a battery barrier 60 and a battery manifold 70. Receiver assembly 25 can be joined to microphone and/or battery assembly 40 by means of a flexible coupling or joint 110.

Preferably, device 20 is configured for placement and use in the bony region 13 of canal 10 so as to minimize acoustic occlusion effects due to in part to the residual volume 6 of air in the ear canal between device 20 and tympanic membrane 18 and the vibrations of the cartilaginous portion 11 of the ear canal that are reflected back to the tympanic membrane when the hearing device is positioned in the cartilaginous portion of the ear canal. The occlusion effects are inversely proportion to residual volume 6; therefore, they can be minimized by placement of device 20 in the bony region 13 so as to minimize volume 6. Preferably, device 20 is also configured for extended wear in ear canal 10. In specific embodiments, hearing device 20 can be configured to be worn continuously in the ear canal, including the bony portion, for 3 months, 6 months or even longer.

Hearing device 20 can include various hearing aids known in the art including, without limitation, ITE, ITC and CIC hearing aids as well assemblies or components thereof e.g., the speaker assembly, etc. For ease of discussion, hearing device 20 will now be referred to as hearing aid 20 (which in many embodiments is a CIC hearing aid configured to be positioned in the bony portion of the ear canal); however other hearing devices described herein or known in the art are equally applicable.

Referring now to FIGS. 4-8, in various embodiments, flexible coupling 110 (also known as joint 110) can comprise a compliant structure 115 which can be a tube or tube like structure. The joint includes lateral and medial portions 120 and 130 (with respect to the ear canal) and pivotal portion 140. In many embodiments, the joint is configured to flexibly couple a receiver assembly 25 of hearing device 20 to one or both of the microphone assembly 30 and battery assembly 40 as is shown in FIG. 4B. Typically, the receiver assembly is medially positioned in the ear canal with respect to microphone and/or battery assembly. Accordingly, lateral portion 120 is configured to be coupled to the battery assembly 40 and/or the microphone assembly 30; and medial portion 130 is configured to be coupled to the receiver assembly 25. However, alternative configurations for coupling the respective assemblies are also contemplated. Typically, microphone assembly 30 and battery assembly 40 are coupled to form a combined assembly 35 and thus in many embodiment lateral portion 130 is configured to be coupled to assembly 35. Accordingly, lateral portion 130 is configured to be coupled to assembly 35. Also, typically, lateral portion 120 will be coupled to the medial portion 35m of combined assembly 35 and medial portion 130 to the lateral portion 251 of microphone assembly 25.

In various embodiments, lateral and medial portions 120 and 130 are configured to fit over and mate with combined assembly 35 and receiver assembly 25 so as to flexibly couple the two assemblies. In many embodiments, the lateral and medial portions are configured to mate with and hold their respective assemblies via an interference or frictional fit. Accordingly, joint 110 can have dimensions and elastic properties (e.g., elastic modulus, elongation, etc) to stretch over the receiver and combined assemblies and retain the those respective assemblies through compressive/frictional forces exerted on the perimeter of the assembly. In specific embodiments, lateral portion 120 has a cavity 121 configured to mate with combined assembly 35 and medial portion 130 has a cavity configured to mate with receiver assembly. Cavity 121 can have a elongated dome or egg shape 120s approximating the shape 35s of combined assembly 35 and cavity 131 can have a rectangular shape 131s approximating the shape 25s of receiver assembly 25. In other embodiments, cavity 121 and cavity 131 can have different shapes to accommodate different shaped assemblies, for example cylindrical, hemi-spherical, etc. Also the each cavity can include one or more additional features 111 to accommodate irregular features on one or more of the combined or receiver assemblies such as wires, solder joints etc. Features 111 can be included in the original mold or extrusion or can be formed later using polymer processing methods known in the art.

Pivotal portion 140 is configured to allow medial portion 120 and lateral portion 130 to pivot with respect to one another in the ear canal, preferably with the minimum application of force. In preferred embodiments, the bending force of the joint can be configured such that when a force is exerted on the hearing aid 20 causing joint 110 to bend (e.g. from deformation of the ear canal, head motion, etc.), the joint will bend with little or no pain or discomfort to the wearer. That is, the bending force is below the threshold for the wearer to sense pain in their ear canal, what is known as the canal pain threshold. Also desirably, the bending force can be below the capillary venous return pressure of the vasculature 10V of the canal epithelium 10E (about 15 mmHg) or other portion of canal wall 10W. In specific embodiments, pivotal portion 140 configured to require less than about 2.3 grams of force to bend.

Figure 6:
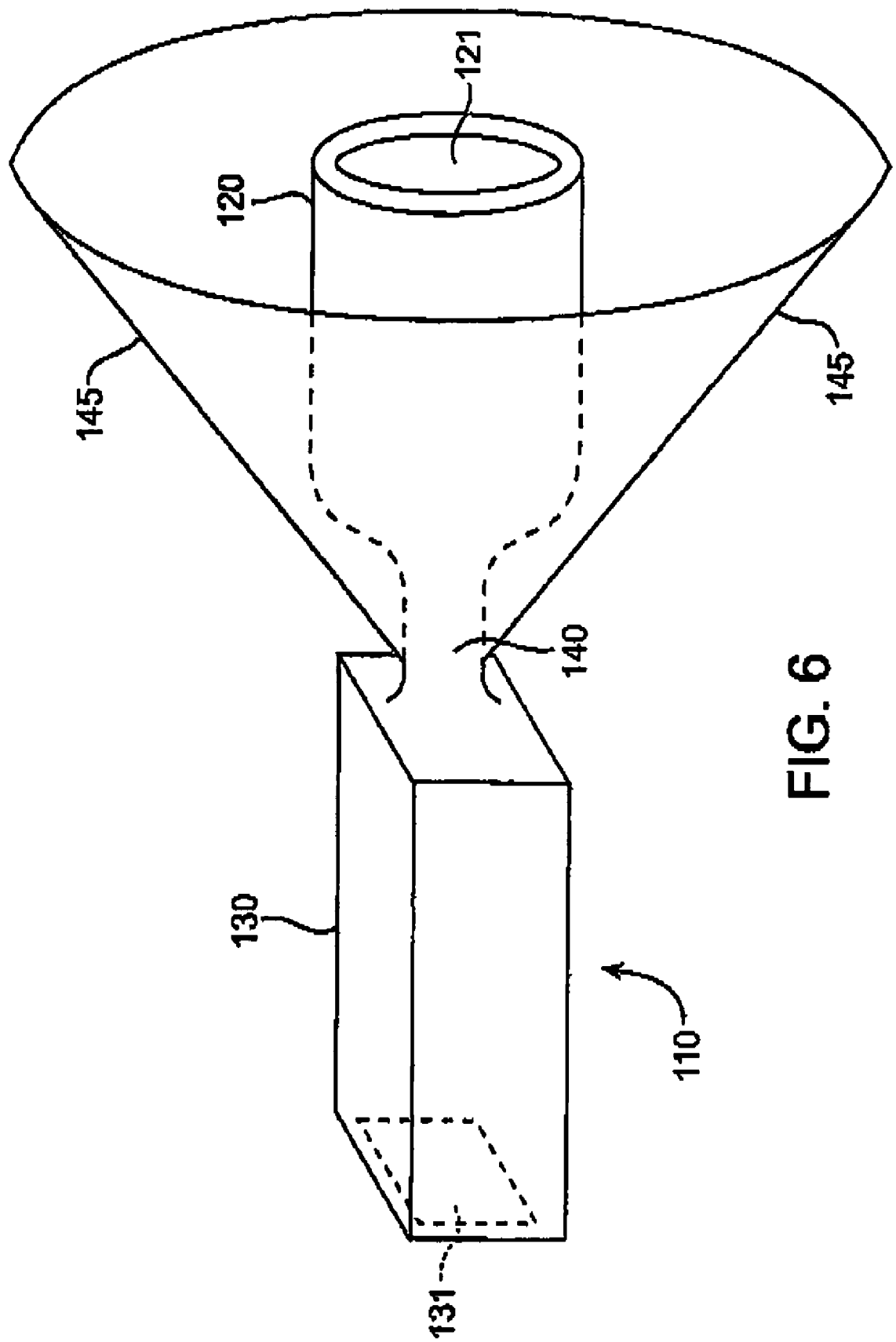
FIG. 6 is a perspective view illustrating the range of motion of an embodiment of the flexible joint.

Typically, pivotal portion 140 is configured to function as a universal joint or the like allowing pivotal motion in three axis, but alternatively, can be configured to allow pivotal motion in two axis. In use, pivotal portion 140 allows either the medial portion 130 or lateral portion to move through a cone of motion 145 as is shown in FIG. 6. While this figure shows a cone of motion 145 for lateral portion 120, such motion is equally applicable to medial portion 130.

In addition to providing for pivotal motion of lateral and medial assemblies, joint 110 and pivotal portion 140 are also desirably configured to minimize the application of force to wiring 125 or like connections between medial and lateral assemblies when the joint is put in tension or compression, such as might occur when the hearing device is advanced into or removed from the ear canal. This can be accomplished by configuring the pivotal portion to have a greater compressive and tensile modulus then wiring 125.

In many embodiments, pivotal portion 140 comprises a necked portion 141 which has a decreased diameter and wall thickness with respect to the lateral and medial portions 130 and 140. Necked portion 141, has a size and shape 141s configured to allow preferential bending of the joint at the necked portion in response to the application of a bending force (e.g., a normal force) on either medial or lateral portion 130 or 140 of the joint. In particular embodiments, the necked portion has decreased bending stiffness with respect to the proximal and distal portions 130 and 140. Necked portion 141 can be produced via one or more of molding, or using hot-air necking techniques known in the medical device arts. Necked portion can also be produced via a compressive member 142 such as an O-ring placed over pivotal portion 140. The shape 141S of necked portion 141 can also be used to control the maximum amount of offset or bend 110M of the joints as described below. For example, the necked portion can have a diameter and shape such that as the necked portion is increasingly bent, portions are put in tension and compression and in turn exert tensile and compressive forces tending to resist any further bending. Suitable shapes 141s for necked portion 141 can include without limitation, U shaped, V-shaped, bell curve shaped, parabolic curve shaped and sinusoidal curve shaped. These or other shapes of the necked portion can be engineered to produce a selectable amount of maximum bend as well as a preformed amount of bend as described herein.

In use, pivotal portion 140 allows the proximal and medial portions of joint 110 and their accompanying coupled assemblies (e.g. the combined assembly and receiver assemblies) to pivot and bend with respect to another during insertion or wear of hearing aid 20 in the ear canal. This pivotal motion facilitates ease of insertion of a CIC or other hearing device in the ear canal by allowing the hearing aid assemblies to readily pivot and bend to accommodate for the various curvatures of the ear canal. Similarly, such pivotal motion also facilitates user comfort by allowing the respective hearing aid assemblies to readily pivot to accommodate for various deformations of the ear canal caused by chewing, yawning, popping ones ears (i.e., clearing the eustachian tubes), and other jaw or head and neck motion without applying appreciable force on the ear canal which may cause the user pain or discomfort or detrimentally effect their equilibrium.

Figure 7:
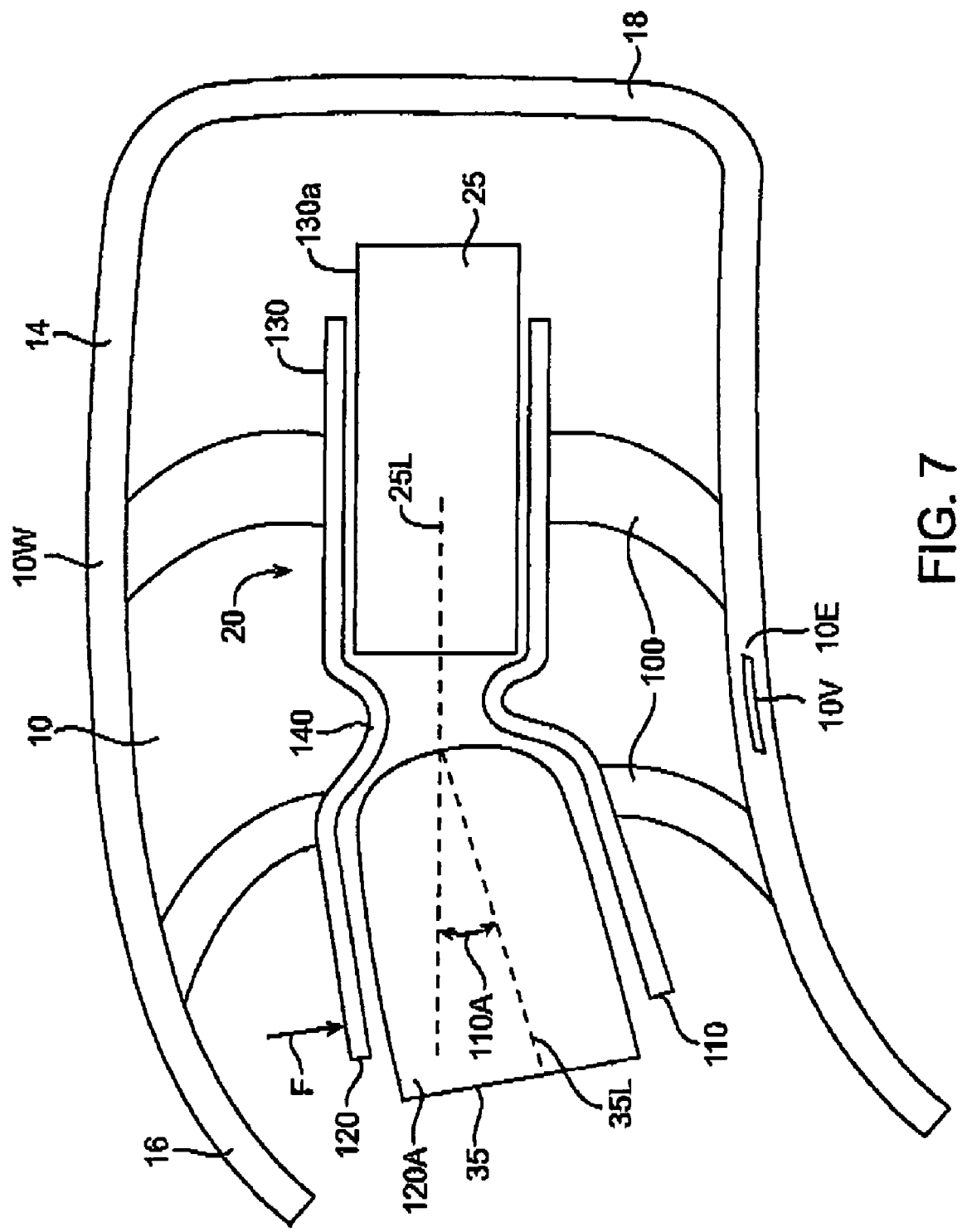
FIG. 7 is a lateral view illustrating use of the flexible joint to maintain seating of retaining seals in the ear canal for a hearing device positioned in the ear canal.

Also, the pivotal action of the joint can be configured to minimize or prevent hearing aid 20 from becoming unseated or displaced so as to detrimentally effect performance of the hearing aid. This can occur for example, due to the unseating or deformation of one or more seals 100 of hearing aid 20 which can be used to retain the hearing aid in the ear, prevent acoustical feedback, and prevent liquid from entering the canal. Unseating of the seal, even partially, can detrimentally effect one or more of these factors. The pivotal portion can prevent such unseating by mechanically isolating the lateral and medial assemblies such that a force F that is exerted on one assembly is not transmitted to the other assembly to cause unseating of a seal coupled to that assembly. This capability can apply to embodiments of hearing aid 20 that include a seal on one or both of medial and lateral assemblies as is shown in FIG. 7. Thus, in various embodiments, the flexible joint serves to enhance the long term wearability and performance of a hearing aid by minimizing unseating of the seals. In particular embodiments, the flexible joint can allow a CIC hearing aid to be worn deep in the ear canal for extended periods such as three to six months or longer without the need to have the device repositioned in the canal.

While having sufficient bending flexibility to allow the medial and lateral portions to bend and pivot with respect to one another, the joint can still allow the transmission of force between the two assemblies to permit specific mechanical functions. For example, the joint including pivotal portion 140 can have sufficient tensile strength to allow transmission of a pull force from lateral assembly to the medial assembly sufficient to remove the medial assembly from the ear canal. Also, pivotal portion 140 can have sufficient torsional strength to allow rotation of the medial assembly 130 in response to rotation of the lateral assembly 120 when the device is positioned in the bony portion of the ear canal. In other words, the joint has sufficient torsional strength to transmit rotational torque from the lateral to the medial assembly to rotate the medial assembly in the ear canal. In use, such embodiments allows the doctor, medical practitioner or the user to reposition the hearing aid in the ear to obtain a better fit and/or acoustical position in the ear canal. The rotational torque can be transmitted using an insertion or removal tool or like device.

In various embodiments, the dimensions and material properties of the joint can be configured to accommodate the typical range of sizes and shapes of the human ear canal. Preferably, the length 110l of the joint is between about 0.5 to 0.67" and more preferably between about 0.59 to 0.63 inches. The lateral portion 120 will typically have an oval cross section 120c with the larger diameter outside 120D in a range between about 0.19 to 0.21 inches. The oval profile can also have the same ration of larger to smaller diameter as the ear canal. The lateral portion will typically have a rectangular cross section 130C with a larger outside dimension 130D in the range of about 0.110 to 0.115 inches.

In addition to the flexible joint itself being configured to accommodate the range of anatomy of ear in canal, in various embodiments joint 110, can be configured to provide an entire hearing aid with a one size fits all capability. That is because the joint allows portions of the hearing aid, such as the combined assembly 35 and the receiver assembly 25 to readily bend and pivot during both insertion and wear in the canal, such that the hearing aid is able to accommodate the ranges of anatomy (e.g., shape, size, etc) of the human ear canal without the need for custom fitting. In specific embodiments, joints for larger user populations can have larger range of motion, while joint for sub-populations (e.g. children) can have less range of motions. In this way the flexibility of the joint can be configured to provide a one size fits all capability for an entire patient population or a sub-population.

In various embodiments all or a portion of joint 110 can be fabricated from a flexible rubber-like material such as one or more elastomers known in the art. Suitable elastomers include without limitation, silicones, polyurethanes, elastomeric fluoropolymers (e.g., VITON and KALREZ available from the Dupont Corporation) and combinations thereof. Preferably, the joint is fabricated from a silicone polymer and more preferably a medical grade silicone. In various embodiments, the joint can be fabricated using one or more polymer processing methods known in the art including for example extrusion, stereo-lithography, machining, molding and injection molding methods. In a preferred embodiments the joint is fabricated using extrusion or injection molding methods. In an alternative embodiments, the joint can be formed using vacuum forming and/or heat shrink methods known in the art wherein all or a portion the joint, such as the lateral or medial portion, is shrunk or otherwise formed onto the respective hearing aid assemblies In various embodiments, the joint can be fabricated as a single integral structure 110I, for example using injection molding methods, or as separate components which are then assembled together using one or more joining methods known in the art (e.g., adhesive bonding, etc. Also the joint can be attached to one or more assemblies of the hearing aid such as the battery/microphone assembly, using one or more of adhesive bonding, ultrasonic welding, thermal bonding or other joining methods known in the art. In a preferred embodiment, the joint is attached to one or more of the hearing aid assemblies using a silicone adhesive.

In various embodiments, joint 110 can be configured to dampen or otherwise minimize the transmission of sound through the joint from one coupled assembly to another coupled assembly (e.g. from the lateral to the medial assembly). The joint is thus desirably configured as an acoustical insulator to acoustically decouple laterally and medially coupled assemblies such a lateral microphone assembly and medial receiver assembly. By acoustically decoupled it is meant that joint minimizes the transmission of sound from one coupled assembly to another coupled assembly. This is done to minimize feedback occurring due to the transmission of sound from the receiver or other assembly to the microphone. The amount of acoustical insulation is defined in terms of acoustical attenuation. In various embodiments the joint can be configured to produce a level of acoustical attenuation of between 5 to 40 dB for sound transmitted through the joint from one coupled assembly to another. The desired amount of acoustical attenuation of the joint can be achieved by selection of one or more properties of the joint including thickness, density, porosity, hardness. Suitable acoustical insulatory materials for joint 110 include soft flexible polymers such as silicones (e.g. RTV silicone), polyurethanes and butyl rubber as well as one or more polymer foams known in the art. The desired hardness of the material, defined in terms of Shore A durometer, can be in the range from about 10 to 40 with a specific embodiment of 30 and 35. Further improvement in the acoustical attenuation can be achieved by degassing the uncured polymers and/or the inclusion of vacuum filled microspheres into the polymer mixture. Further description of the factors effecting acoustical attenuation and the methods for improving attenuation properties (e.g. with the use of microspheres) is found in U.S. Pat. No. 4,079,162 which is fully incorporated herein by reference.

In various embodiments, the acoustical insulative properties of the joint can be enhanced, particularly at selected frequencies, through the use of one or more coatings 10S such as a silicone coating. Coating 110S can be configured to provide greater acoustical attenuation over a selected range of frequencies which can partially or fully overlap the attenuation frequency range of the joint or be at a different frequency range altogether. Thus in use, the coating provides a bi or even multi level frequency range of acoustical attenuation. In specific embodiments, the coating can be configured to increase the acoustical attenuation of joint 110 by at about between 5 to 10 decibels. The coating can be configured to produce different amounts acoustical attenuation by varying one or more of the viscosity/or filler components of the coating. For example, increased attenuation can be achieved by increasing the viscosity of the coating or increasing the concentration of particles. For silicone coatings, silica filler can be used, or a silica free solution can be employed. Also, the coating can be configured to fill in any pores or micro imperfections in the joint that may act as channels for acoustical leakage. In this way, the coating serves as an acoustical attenuation fault tolerance layer as well as a self repairing acoustical insulating layer.

Figure 8:
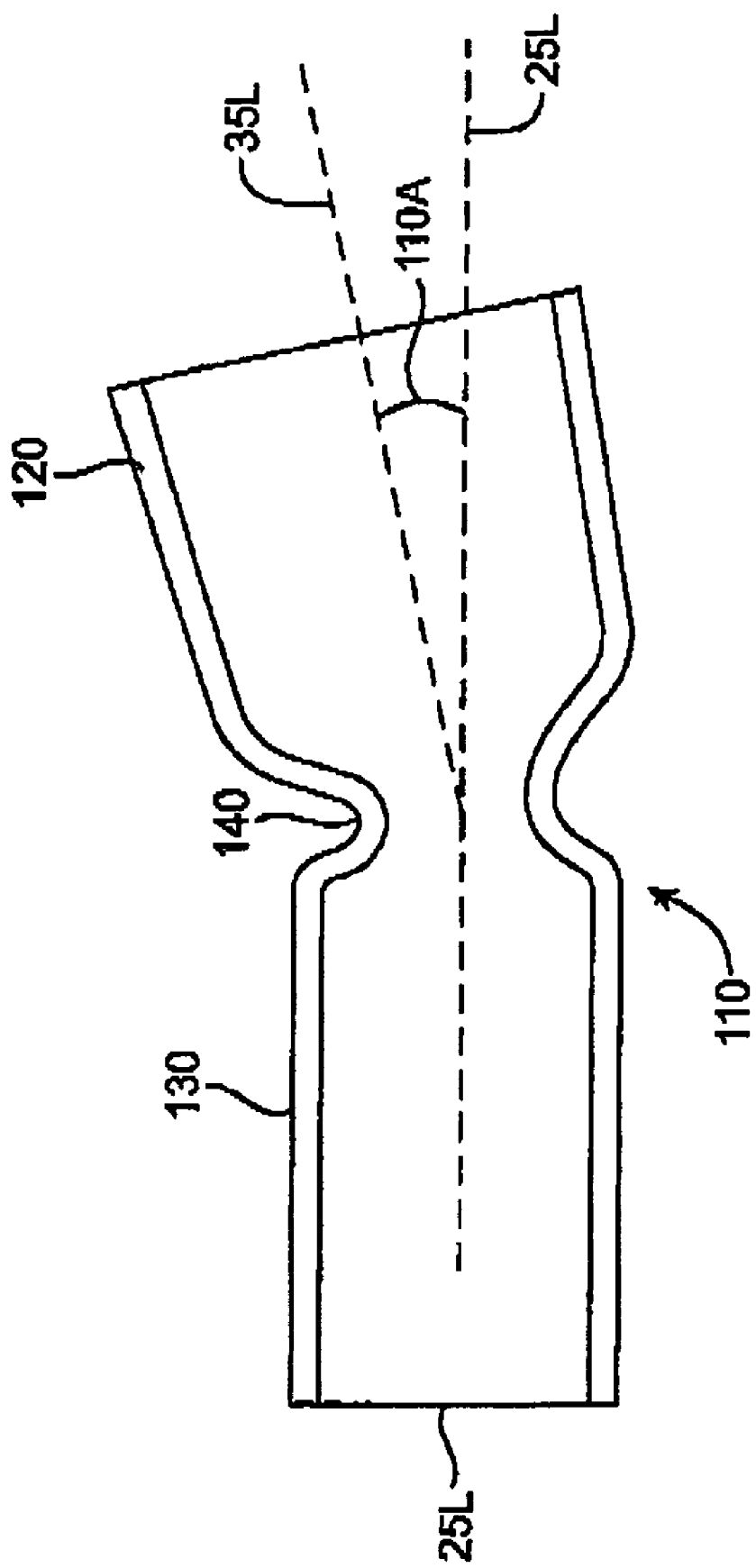
FIG. 8 is a lateral view illustrating an embodiment of the flexible joint having an offset angle.

In various embodiments, joint 110 can also be configured to retain one or more components of the hearing aid in a selectable position or angle relative to one another. As illustrated in FIG. 8, in specific embodiments joint 110 can have a shape configured to retain microphone assembly 30 and receiver assembly at a selectable angle known as offset or bend angle 20A with respect the longitudinal axis of each assembly. This can be accomplished by molding or otherwise pre-forming the joint to have an angled or bent shape that defines the offset angle. While embodiments of the joint having an offset angle maintain the angle in a neutral position, such joints are flexible and free to pivot through a range or cone of motion as other embodiments of the flexible joint described herein.

In various embodiments, offset angel 110A can range from about 10 to 40° with specific values of 15, 25 and 35°. In a preferred embodiment, the joint is configured to produce an offset angle 110A such that longitudinal axis 35L of combined assembly 35 is oriented 15° anteriorly (i.e. with respect to the users nose) with respect to the longitudinal axis 25L of speaker assembly 25. This angle gives hearing aid 20 a banana like shape which serves to accommodate the shape of ear canal and so improve the fit of the hearing aid in the ear canal both during static and dynamic situations (e.g. during jaw movement).

Figure 9A:
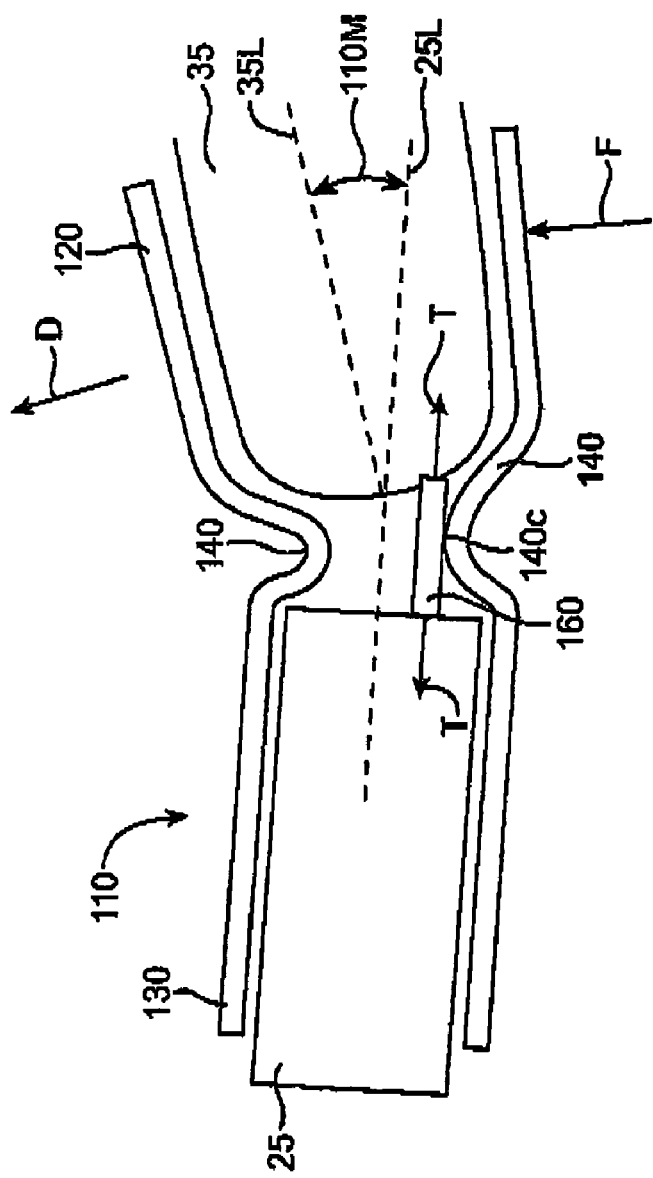
FIG. 9A is a lateral view illustrating an embodiment of the flexible joint having a bend limiting member.
Figure 9B:
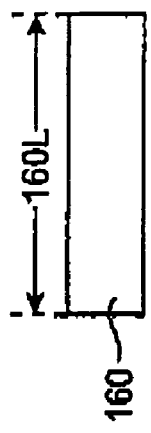
FIG. 9B is a side view illustrating an embodiment of the bend limiting member.

Referring now to FIGS. 9A-9B, in various embodiments joint 110 can include a bend limiting member or stop member 160 or other bend limiting means. Member 160 functions to limit the maximum amount of bend or offset 110A so as to prevent the joint and hearing aid from jack-knifing upon insertion or re-positioning in the ear canal. At least a portion of member 160 can be positioned on inner surface 140i of pivotal section 140 and can be coupled to one or both of lateral assemblies 120a and medial assemblies 130a. Member 160 functions as a supportive strut to joint such that that when the joint is bent in a direction D away from the member to a maxim angle 110M member 160 is put in tension T so as to oppose further bending. In this way, member 160 limits the maximum amount of bending of pivotal section 140 and thus the amount of bend between the lateral and medial portions. Member 160 thus has sufficient tensile stiffness to oppose bending forces F imposed on joint 110 such as those that occurring during insertion of the hearing aid. The maximum angle 110AM can determined by one or more of the length 160L and stiffness of member 160 as well as where the member is attached to the joint and/or assemblies 120A and 130A. A lower maximum deflection can be obtained by increasing the stiffness of member 160, for example by increasing the thickness of the member. In various embodiments, maximum angle 110AM can be in the range from about 30 to about 45°. In a preferred embodiment, maximum angle 110AM is no greater than about 45°

In various embodiments member 160 can comprise a metal such as stainless steel or metal wire of various gauge or resilient polymers known in the art such as polyethylene, polyester polycarbonate, acrylic or like material. In a preferred embodiment, member 160 comprises a strip of MYLAR which is coupled to pivotal portion 140. In other embodiments member 160 can comprise a spring or shape memory material. Member 160 can be adhesively attached to joint 110 or assemblies 120A or 130A or can be set in place when joint 110 is molded or extruded such that the joint is formed around the member.

CONCLUSION

The foregoing description of various embodiments of the invention has been presented for purposes of illustration and description. It is not intended to limit the invention to the precise forms disclosed. Many modifications, variations and refinements will be apparent to practitioners skilled in the art. For example, embodiments of the flexible joint can be used on a number of hearing devices including ITC devices. Further, the teachings of the invention have broad application in the hearing aid device field as well as other fields which will be recognized by practitioners skilled in the art.

Elements, characteristics, or acts from one embodiment can be readily recombined or substituted with one or more elements, characteristics or acts from other embodiments to form numerous additional embodiments within the scope of the invention. Hence, the scope of the present invention is not limited to the specifics of the presented embodiments, but is instead limited solely by the appended claims.

What is claimed is:

1. A flexible joint for a CIC hearing device positionable in a portion of an ear canal of a user, the joint comprising:

a compliant tube consisting of a single integral structure having a lateral end, a medial end, a necked portion allowing the ends to pivot relative to each other, and a lumen extending from the lateral end to the medial end, wherein the lateral end of the lumen is open and configured to receive a lateral hearing device assembly and the medial end of the lumen is open and configured to receive a medial hearing device assembly, the tube configured to allow the lateral hearing device assembly to advance the medial hearing device assembly into the ear canal and have at least a portion of the CIC hearing device conform to the shape of the ear canal via pivotal movement of the lateral and medial assemblies about the necked portion, wherein the tube acoustically decouples the two assemblies.

2. The joint of claim 1, wherein the medial hearing device assembly comprises a receiver assembly and the lateral hearing device assembly comprises a microphone assembly.

3. The joint of claim 1, wherein the necked portion has a decreased stiffness relative to other portions of the tube.

4. The joint of claim 1, wherein at least a portion of the compliant tube comprises at least one of elastomer or a silastic.

5. The joint of claim 1, wherein the tube comprises a molded structure.

6. The joint of claim 1, wherein the lateral end of the lumen is shaped to fit over and retain the lateral assembly.

7. The joint of claim 6, wherein the lateral portion of the compliant tube has a substantially oval cross section.

8. The joint of claim 1, wherein the medial end of the lumen is shaped to fit over and retain the medial assembly.

9. The joint of claim 8, wherein the medial portion of the compliant tube has a substantially rectangular shape.

10. The joint of claim 1, wherein the necked portion has sufficient torsional strength to allow rotation of the medial assembly in response to rotation of the lateral assembly when the device is positioned in the bony portion of the ear canal.

11. The joint of claim 1, wherein the member is configured to transmit a pull force from the lateral assembly to the medial assembly sufficient to remove the medial assembly from the ear canal when the hearing device is positioned in the ear canal.

12. The joint of claim 1, wherein the compliant tube is configured to minimize an application of force to a wire or structure positioned within the lumen, when the member is put in tension.

13. The joint of claim 1, wherein the necked portion is configured to allow three degrees of rotation of the assemblies.

14. The joint of claim 1, wherein the necked portion is configured to define a cone of pivotal movement of the medial assembly relative to a longitudinal axis of the lateral assembly.

15. The joint of claim 1, wherein the necked portion is configured to bend in response to deformation of the ear canal with minimal pain to the ear canal of the user.

16. The joint of claim 1, wherein a bending force of the necked portion is less than a canal pain threshold of the wearer.

17. The joint of claim 1, wherein a bending force of the necked portion is less than a capillary venous return pressure of the canal epithelium.

18. The joint of claim 1, wherein the necked portion is configured to transmit no more than about 2.3 grams of force in response to a bending force exerted by either assembly.

19. The joint of claim 1, wherein the joint is configured to mechanically isolate the medial assembly from the lateral assembly such that a seal coupled to one assembly and seated in the ear canal, is not unseated or deformed in response to a force exerted by the other assembly.

20. The joint of claim 1, wherein the necked portion of the joint has a preformed bend angle between the lateral and medial portions.

21. The joint of claim 20, wherein the bend angle is about 15°.

22. The joint of claim 1, wherein the joint includes a stop member to limit a maximum bend angle of the lateral portion with respect to the medial portion, at least a portion of the stop member disposed within the necked portion.

23. The joint of claim 22, wherein the maximum bend angle is in a range of about 30 to about 45°.

24. An extended wear CIC hearing device for operation in a portion of an ear canal of a user, the hear device comprising:
a flexible joint as in claim 1;
a microphone assembly configured to be electronically coupled to a battery assembly for powering the hearing device, said microphone assembly received in the open lateral end of the lumen; and
a receiver assembly configured to supply acoustic signals received from the microphone assembly to a tympanic membrane of the user, said receiver assembly received in the open medial end of the lumen.

* * * * *